United States Patent

[11] 3,591,231

| [72] | Inventors | Henry W. Wessells<br>Paoli;<br>Walter S. Eggert, Jr., Huntingdon Valley,<br>both of, Pa. |
|---|---|---|
| [21] | Appl. No. | 842,279 |
| [22] | Filed | July 16, 1969 |
| [45] | Patented | July 6, 1971 |
| [73] | Assignee | The Budd Company<br>Philadelphia, Pa. |

[54] FABRICATED UNISIDE FOR A UNITIZED BODY
3 Claims, 4 Drawing Figs.

| [52] | U.S. Cl. | 296/28 R |
|---|---|---|
| [51] | Int. Cl. | B62d 25/02 |
| [50] | Field of Search | 296/28, 28.4 |

[56] References Cited
UNITED STATES PATENTS

| 2,113,075 | 4/1938 | Breer et al. | 296/28 |
| 2,254,458 | 9/1941 | Swallow | 296/28 |
| 2,404,870 | 7/1946 | Ulrich | 296/28 |

FOREIGN PATENTS

| 890,163 | 9/1953 | Germany | 296/28.4 |
| 626,305 | 7/1949 | Great Britain | 296/28 |
| 1,043,540 | 9/1966 | Great Britain | 296/28 |

*Primary Examiner*—Benjamin Hersh
*Assistant Examiner*—John A. Pekar
*Attorneys*—Thomas I. Davenport, Edward M. Farrell, John B. Sowell, Alford L. Trueax, Jr. and William R. Nolte

ABSTRACT: A fabricated uniside unit for a unitized body structure utilizing small economical stampings doubled in high-stress areas for greater strength and forming frustum-reinforced beam sections at extremely stressed areas. Portions of the uniside units form side sill structure while other portions act as shear panels for supporting load applied to the body structure.

INVENTORS
HENRY W. WESSELLS, III
WALTER S. EGGERT, JR.
BY
ATTORNEY

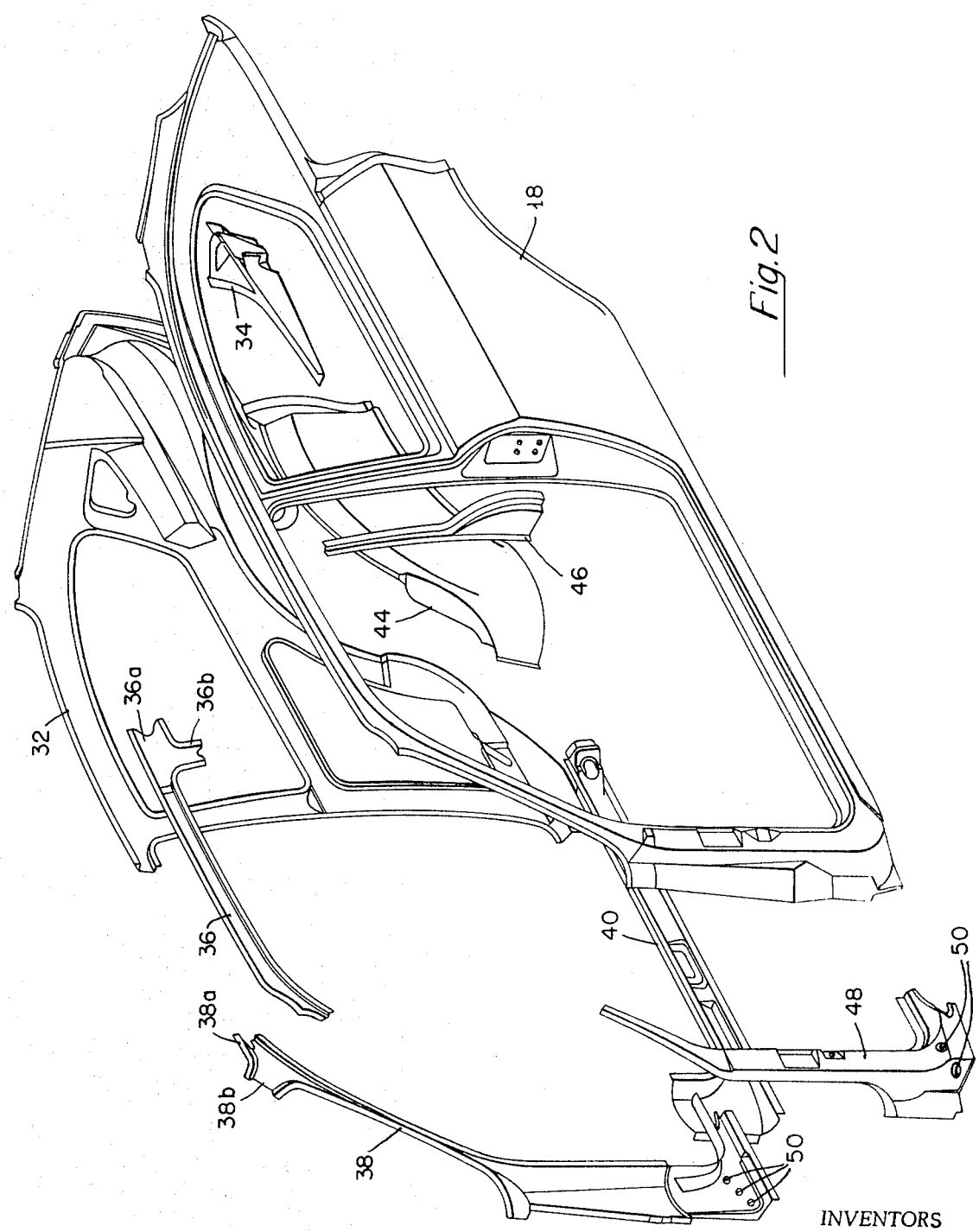

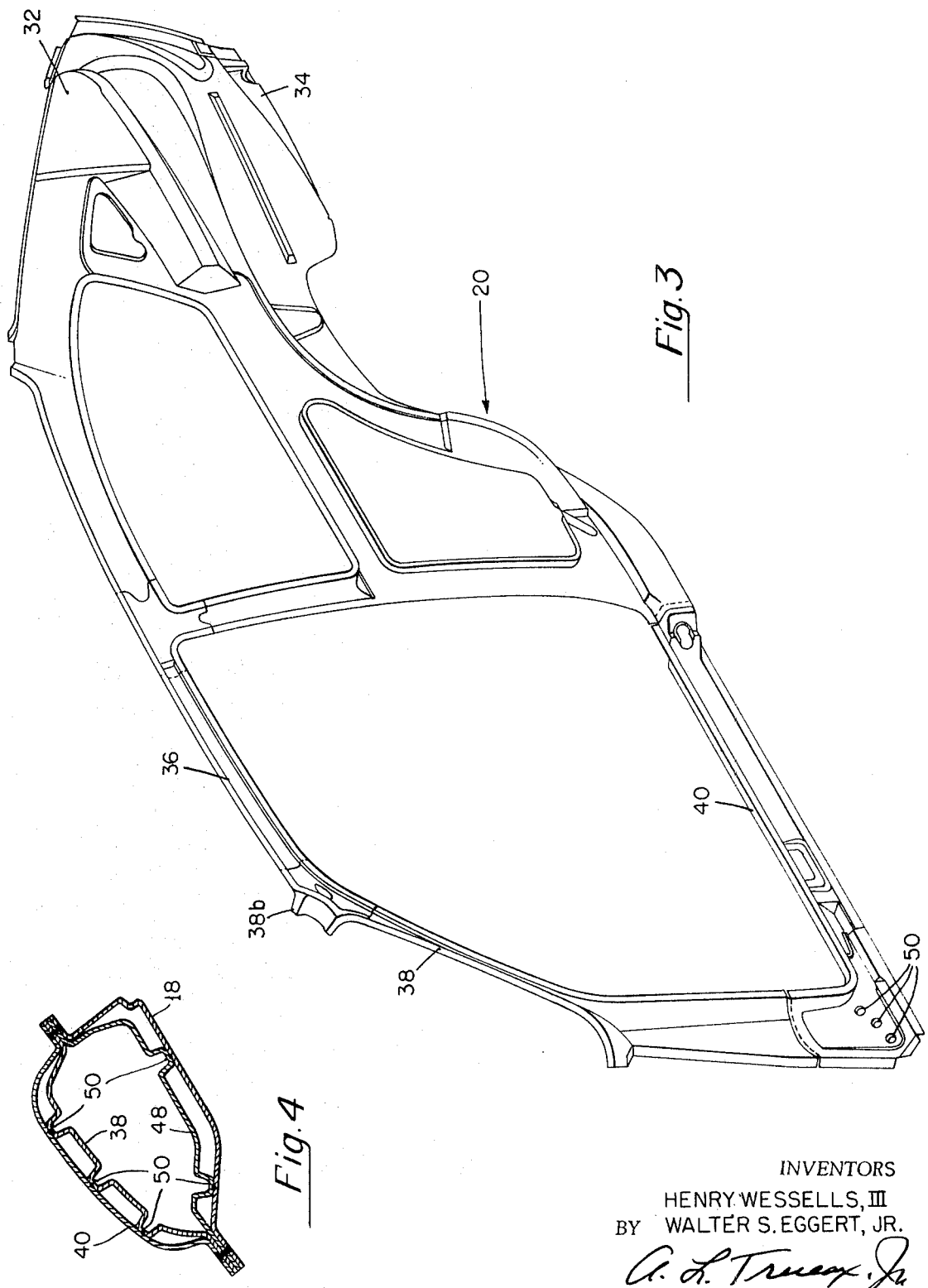

3,591,231

FABRICATED UNISIDE FOR A UNITIZED BODY

This invention is an improvement of the structure shown in our copending U.S. Pat. application Ser. No. 681,469, filed Nov. 8, 1967, now U.S. Pat. No. 3,455,595 and entitled "Automobile Body Sidesill Construction."

This invention relates to automobile bodies and more particularly to a unitized body having fabricated uniside units providing the sidewalls and the side sills of the body.

In the prior art uniside units were fabricated by joining an outer uniside panel and an inner uniside panel and reinforcing the high-stress areas with a patch panel.

An object of this invention is to provide a uniside unit utilizing a large outer uniside panel and replacing the conventional inner uniside panel with a fabricated panel having small stampings that are designed to overlay in the high-stress areas thereby providing built-in reinforcements and reducing assembly time and costs.

Often in unitized vehicle bodies, the side sills of a conventional vehicle body were replaced by securing channel members to the uniside units.

Another object of the present invention is to extend the lower edge of the uniside panel and form a channel member thereby eliminating additional fixtures and welding for joining channel members to the uniside units.

A further object of this novel uniside unit is to provide frustum-reinforced structural beam members formed in the components to reinforce the area of extreme stresses and prevent failure of the vehicle body in these areas.

These and other objects of this invention will become apparent as reference is made to the following specification and drawings wherein:

FIG. 2 is an exploded perspective view of a uniside unit;

FIG. 3 is an assembled inner uniside panel as viewed from outside the body;

FIG. 4 is an enlarged sectional view taken substantially on the line 4—4 of FIG. 1, in the direction of the arrows, showing the frustum-reinforced beam structure formed in the corner of the uniside unit.

Figure 1:
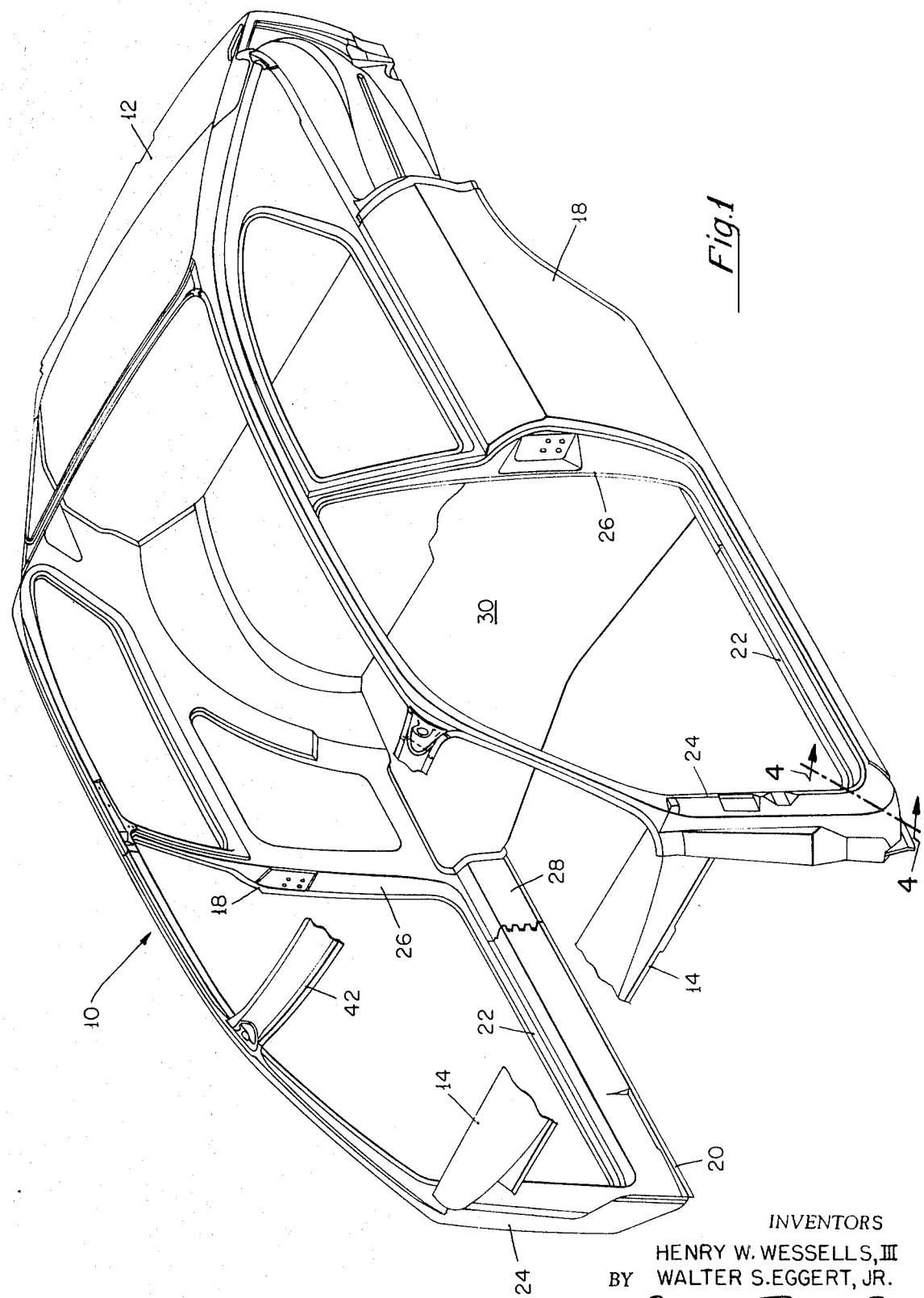
FIG. 1 is a front-to-side perspective view, with sections broken away, of the passenger compartment and rear portions of a vehicle body utilizing the present invention.

Referring to FIG. 1, the vehicle body shell 10 includes a rear assembly 12 connected to a front dash panel 14 by left and right uniside units 16. The left and right uniside units are largely identical in mirror reverse; therefore, the same numeral will be used to identify similar parts and at times one will be shown instead of the other to avoid switching from right to left views of the units.

Each uniside unit includes an outer uniside panel 18 formed from a single stamping and an inner uniside panel 20 fabricated from a plurality of smaller stampings and assembled as seen in FIG. 3. The bottom side sill portion 22 of the uniside unit 16 extends from the forward A-post portion 24 to a transition zone in the area of the B-post portion 26.

A portion of the rear underbody structure 28 extends forwardly of the B-post portion 26 for reinforcing the transition zone in the side sill 22 at the base of the B-post. The rear floor pan 30 extends between and is joined to the inner uniside panels at the rear of the body.

As best seen in FIGS. 2 and 3, the fabricated inner uniside panel 20 includes an inner rear quarter panel 32; a rear-bumper-mounting bracket 34 secured at the lower rear portion of the inner rear quarter panel 32 for supporting a rear bumper (not shown); a door-opening header 36 provides a doubled thickness at the top of the B-post portion where it is joined to the inner rear quarter panel 32 with an arm 36a extending along the upper edge of the inner rear quarter panel and a second arm 36b extending downwardly along the B-post portion; an inner hinge pillar 38 is connected to the forward end of the door-opening header 36 and extends downwardly from the overlapped connection wherein an arm 38a extends along the door-opening header 36 and a second arm 38b extends toward the opposite uniside for being connected to one end of the upper windshield header 42 which extends between the unisides; and a door-opening sill 40 has one end overlapped and joined to the lower end of the inner hinge pillar 38 and the other end is overlapped and joined to the lower B-post portion of the inner rear quarter panel 32 to complete the inner uniside panel 20. Thus it can be seen that the inner uniside panel 20 has doubled metal thickness at the upper ends of the A-post and B-post portions for added strength and stiffness in these high-stress areas to resist deformation of the joint area.

Referring now to FIG. 2, to further reinforce the uniside unit 16, the outer uniside panel 18 is also provided with double metal thickness in high stress areas. This panel 18 includes a rear wheelhouse panel 44 secured to the inner side of the outer rear quarter section to the rear of the B-post portion; a door lock reinforcement 46 joined to the B-post; and a body hinge reinforcement 48 joined to the A-post portion.

In the uniside unit 16, the front lower corner was found to be an area of extreme stress concentration due to the joining of the front end assembly (not shown) to the body shell 10. It was found that double thickness on the inner uniside panel 20 and outer uniside panel 18 did not provide adequate strength in this area. To overcome this problem, a series of frustum-type projections or dimples 50 are impressed in one of the doubled parts, in this embodiment the inner hinge pillar 38 and the body hinge reinforcement 48 are provided with the dimples 50. As best seen in FIG. 4, the door-opening sill 40 cooperates with the inner hinge pillar 38 and the outer uniside panel 18 cooperates with the body hinge reinforcement 48 to provide a frustum-reinforced trussed beam structure by the welding of the dimples 50 to the adjacent structure. This truss structure provides sufficient strength in the front lower corner of the uniside unit 16 to withstand the stresses imposed thereon and resist deformation.

When the inner uniside panel 20 has been fabricated as shown in FIG. 3, the outer uniside panel 18 with the reinforcement secured thereto is joined to the inner uniside by welding of the exposed external flanges to form the uniside unit.

While but one embodiment of this invention has been shown and described, in detail, it is to be understood that there may be various embodiments and modifications within the general scope of the invention.

We claim:

1. In combination in a vehicle body having unitized construction; a pair of uniside units extending longitudinally along each side of the vehicle body for connecting a front-end assembly and a rear assembly; each uniside having an A-post, a B-post including a door lock reinforcement secured thereto, a lower sill unit connecting the lower ends of the A-post and B-post, a door header connecting the upper ends of the A-post and B-post, and a rear quarter panel having a rear wheelhouse reinforcement secured thereto, said uniside unit including an outer uniside panel having a body hinge reinforcement secured to said A-post portion, and a fabricated inner uniside panel including an inner rear panel having a B-post portion, a rear-bumper-mounting bracket secured to said inner rear quarter panel, a door-opening header secured to said inner rear quarter panel at the top of said B-post portion, a door-opening sill secured to said inner rear quarter panel at the bottom of said B-post portion, and an inner hinge pillar forming an A-post portion having the upper end secured to said door-opening header and the lower end secured to said door-opening sill.

2. The body construction as claimed in claim 1 wherein said door-opening header includes a first arm extending along and secured to the upper edge of said inner rear quarter panel and a second arm extending downwardly along and secured to said B-post portion for providing a double metal thickness where said door opening header is secured to said inner rear quarter panel.

3. The body construction as claimed in claim 1 wherein said inner hinge pillar includes a first arm extending along and secured to said door-opening header and a second arm extending substantially normal to said first arm for being secured to a windshield header extending between said uniside units whereby double thicknesses are provided at the joint between the windshield header, the door-opening header and the inner door hinge pillar.